(12) United States Patent
Choi et al.

(10) Patent No.: US 11,525,912 B2
(45) Date of Patent: Dec. 13, 2022

(54) HYPER-TUBE SYSTEM USING VEHICLE POSITION DETECTION

(71) Applicant: Korea Railroad Research Institute, Uiwang-si (KR)

(72) Inventors: SuYong Choi, Suwon-si (KR); JaeHeon Choi, Anyang-si (KR); JungYoul Lim, Seoul (KR); ChangYoung Lee, Bucheon-si (KR); KwanSup Lee, Gunpo-si (KR); YongJun Jang, Suwon-si (KR); JeongMin Jo, Suwon-si (KR); JinHo Lee, Seoul (KR); MinHwan Ok, Uiwang-si (KR); JaeHoon Kim, Goyang-si (KR); LeeHyeon Kim, Uiwang-si (KR)

(73) Assignee: KOREA RAILROAD RESEARCH INSTITUTE, Uiwang-si (KR)

(*) Notice: Subject to any disclaimer, the term of this patent is extended or adjusted under 35 U.S.C. 154(b) by 286 days.

(21) Appl. No.: 16/652,557

(22) PCT Filed: Dec. 10, 2018

(86) PCT No.: PCT/KR2018/015636
§ 371 (c)(1),
(2) Date: Mar. 31, 2020

(87) PCT Pub. No.: WO2019/221353
PCT Pub. Date: Nov. 21, 2019

(65) Prior Publication Data
US 2020/0241137 A1     Jul. 30, 2020

(30) Foreign Application Priority Data
May 14, 2018  (KR) .......................... 10-2018-0054622

(51) Int. Cl.
*G01S 17/06* (2006.01)
*B60L 15/20* (2006.01)
(Continued)

(52) U.S. Cl.
CPC .............. *G01S 17/06* (2013.01); *B60L 15/20* (2013.01); *B61B 13/08* (2013.01); *B61B 13/10* (2013.01)

(58) Field of Classification Search
CPC ...... B60L 13/03; B60L 15/20; B60L 2240/62; B60L 2220/14; B60L 2240/12;
(Continued)

(56) References Cited

U.S. PATENT DOCUMENTS 7,199,883 B1 * 4/2007 Schaad ................... B60L 13/10
                                                    108/169
9,199,654 B2   12/2015 Kang
(Continued)

FOREIGN PATENT DOCUMENTS

JP    2012-240519 A    12/2012
JP    2014-202527 A    10/2014
(Continued)

OTHER PUBLICATIONS

Machine translation of KR 10-1015170, Feb. 2011.*
(Continued)

*Primary Examiner* — Peter B Kim
(74) *Attorney, Agent, or Firm* — Sughrue Mion, PLLC

(57) ABSTRACT

The present disclosure provides a hypertube system for detecting a position of a hypertube vehicle, including a hypertube vehicle, a tube configured to surround a travel path of the hypertube vehicle, At least one LiDAR sensor each mounted on an inner wall of the tube and including a laser transmitter configured to irradiate a laser beam toward the hypertube vehicle and a laser receiver configured to
(Continued)

detect a laser, and a reflector configured to reflect the laser irradiated from the LiDAR sensor, wherein the reflector may be disposed in the hypertube vehicle, and wherein the laser beam reflected from the reflector reaches the laser receiver of the LiDAR sensor to be used in detecting the position of the hypertube vehicle.

26 Claims, 12 Drawing Sheets

(51) Int. Cl.
*B61B 13/08* (2006.01)
*B61B 13/10* (2006.01)

(58) Field of Classification Search
CPC . B61B 13/08; B61B 13/10; B61L 1/02; B61L 1/10; B61L 2210/04; B61L 25/025; B61L 25/02; G01S 17/06; G01S 17/08; G01S 17/58; G01S 17/87; G01S 17/88; G01S 7/4813; G01S 7/4814; Y02T 10/72; Y02T 90/16; B61C 3/00; H01S 3/0071
See application file for complete search history.

(56) References Cited

U.S. PATENT DOCUMENTS

| | | |
|---|---|---|
| 2017/0057528 A1 | 3/2017 | Green et al. |
| 2019/0154889 A1* | 5/2019 | McWhirter ....... H01L 27/14643 |

FOREIGN PATENT DOCUMENTS

| | | | |
|---|---|---|---|
| KR | 10-2010-0078591 A | 7/2010 | |
| KR | 101015170 B1 | 2/2011 | |
| KR | 10-1284897 B1 | 7/2013 | |
| KR | 102350621 B1 * | 7/2017 | ........... G01S 7/4814 |
| KR | 1020170089686 A | 8/2017 | |
| WO | 9919195 A1 | 4/1999 | |
| WO | 2017/033150 A1 | 3/2017 | |
| WO | WO-2020054896 A1 * | 3/2020 | ........... G01S 7/4813 |

OTHER PUBLICATIONS

Machine translation of JP 2014-202527, Oct. 2014.*
International Search Report for PCT/KR2018/015636 dated Apr. 18, 2019 (PCT/ISA/210).
Communication dated Jun. 1, 2021, from the European Patent Office in application No. 18919157.0.
Jinho Lee et al., "The Design and Performance Evaluation of Position Detection System for Super Speed Maglev", 2014 14th International Conference on Control, Automation and Systems (ICCAS 2014), Oct. 22-25, 2014, pp. 424-426 ( 3 pages total).

* cited by examiner

HYPER-TUBE SYSTEM USING VEHICLE POSITION DETECTION

CROSS REFERENCE TO RELATED APPLICATIONS

This application is a National Stage of International Application No. PCT/KR2018/015636 filed Dec. 10, 2018, claiming priority based on Korean Patent Application No. 10-2018-0054622, filed May 14, 2018.

TECHNICAL FIELD

The disclosure in some embodiments relates to a hypertube vehicle position detection system and a hypertube system including a hypertube vehicle position detection system.

BACKGROUND

The statements in this section merely provide background information related to the present disclosure and do not necessarily constitute prior art.

A hyperloop or hypertube system is being developed recently for allowing a magnetic levitation or maglev train to travel within a partially evacuated conductor tube having a near-vacuum state on the order of 0.001 atm. The hypertube system is a highly expected next-generation mobile vehicle capable of moving at a maximum high speed of 1,200 km/h.

Hypertube system particularly needs the precision of position detection of the vehicle. The accuracy of positioning the vehicle is preferably within the error range of a few centimeters. In order to detect the position of a vehicle, an existing precision vehicle position detection system for a maglev railway has used the non-contact type sensor such as a magnetic/electric sensor, an ultrasonic sensor, or an optical sensor. Such a sensor needs to be installed every 3 cm along the guideway so as not to generate an error of 3 cm or more in positioning the vehicle, and they are supposed to be installed in the entire section of operation, thereby incurring an excessive installation cost of the sensor and making maintenance difficult.

With a magnetic/electric sensor, a lot of noise occurs due to a high magnetic field generated by a superconductor electromagnet installed in a hypertube vehicle, which hinders the position detection.

On the other hand, an ultrasonic sensor is deficient due to its relatively slow response time.

Installing an optical sensor not only requires the light receiving unit/light emitting unit to be arranged at every interval comparable to the required precision but also requires the sensor to be periodically cleaned due to the dust inside the hypertube infrastructure.

DISCLOSURE

Technical Problem

The present disclosure in at least one embodiment seeks to provide a hypertube vehicle position detection system capable of detecting the vehicle position with accuracy by the error range of 3 cm or less in a hypertube system.

In addition, the present disclosure in at least one embodiment seeks to provide a hypertube vehicle position detection system that minimizes the number of sensors required, enables easy installation and maintenance work, and reduces sensor installation costs.

In addition, the present disclosure in at least one embodiment seeks to provide a vehicle position detection system that can be used even in a near-vacuum tube environment and has low communication latency and loss despite the rapid speed of the vehicle.

In addition, the present disclosure in at least one embodiment seeks to provide a hypertube system for controlling the operation of a vehicle by using a vehicle position detection system capable of accurately detecting the position of the vehicle.

SUMMARY

At least one aspect of the present disclosure provides a hypertube system for detecting a position of a hypertube vehicle, including a hypertube vehicle, a tube, LiDAR sensor at least one LiDAR sensor, and a reflector. The tube is configured to surround a travel path of the hypertube vehicle. The At least one LiDAR sensor are each mounted on an inner wall of the tube, including a laser transmitter configured to irradiate a laser beam toward the hypertube vehicle and a laser receiver configured to detect the laser beam. The reflector is configured to reflect the laser irradiated from the LiDAR sensor, and it may be disposed in the hypertube vehicle. Here, the laser beam reflected from the reflector reaches the laser receiver of the LiDAR sensor to be used in detecting the position of the hypertube vehicle.

DETAILED DESCRIPTION

Figure 1:
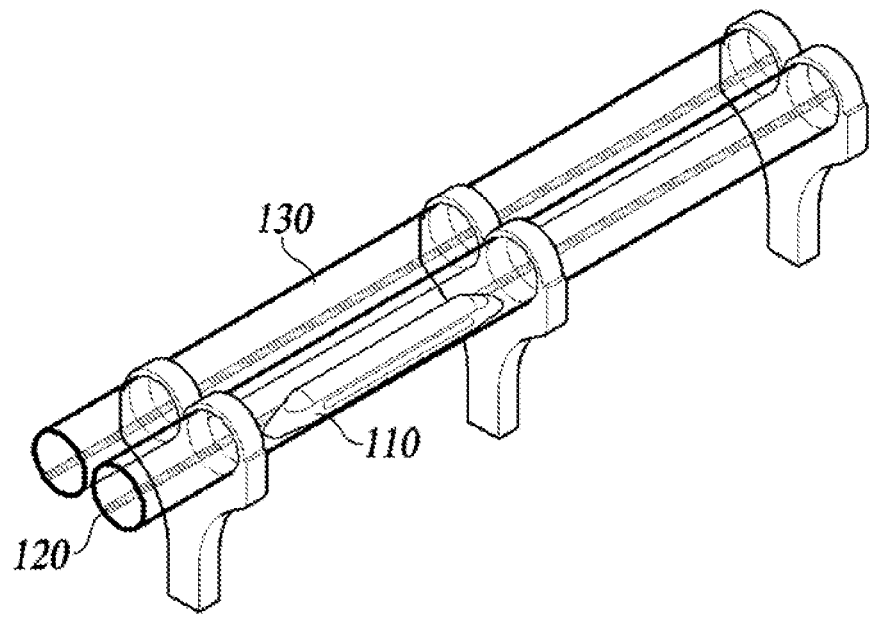
FIG. 1 is a schematic perspective view of a configuration of a hypertube system according to at least one embodiment of the present disclosure.

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely for the purpose of differentiating one component from the other, not to imply or suggest the substances, the order or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The hypertube system described below may include the construction of a system for detecting the position of a hypertube vehicle, which is at least one embodiment of the present disclosure. Further, in the following description, "hypertube vehicle 110" may be abbreviated as "vehicle 110."

FIG. 1 is a schematic perspective view of a configuration of a hypertube system according to at least one embodiment of the present disclosure.

As shown in FIG. 1, the system for detecting the position of a hypertube vehicle according to at least one embodiment of the present disclosure includes a hypertube vehicle 110, a guideway 120, and a tube 130 among others.

The hypertube vehicle 110 is movable within the tube 130 along the guideway 120. The hypertube vehicle 110 may further include a vehicle body 111 and a reflector 112 which will be described below.

The hypertube vehicle 110 proceeds along the guideway 120. A method of operating the hypertube vehicle 110 will be described with reference to FIG. 3.

Figure 3A:
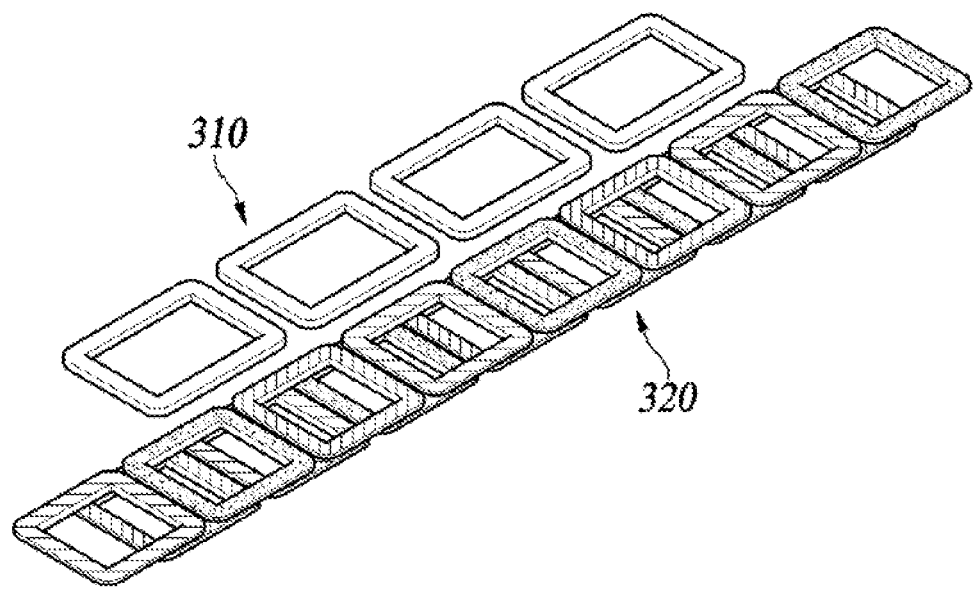
FIGS. 3A and 3B are diagrams of the constructions of air-core linear synchronous motors (LSMs) for providing power to a hypertube vehicle in a hypertube system and of superconductor (High Temperature Superconductor, "HTS") electromagnets disposed on the hypertube vehicle side according to at least one embodiment of the present disclosure.
Figure 3B:
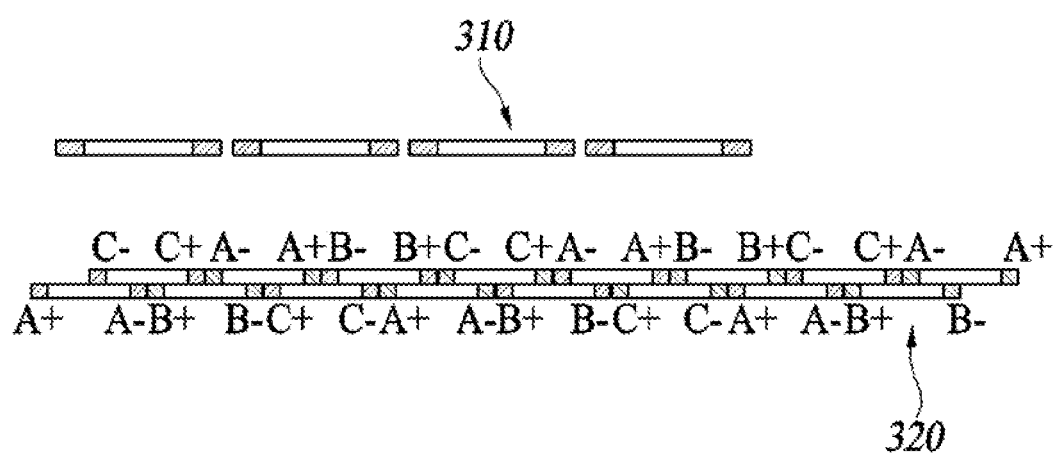

FIGS. 3A and 3B are diagrams of the constructions of air-core linear synchronous motors (LSMs) 320 for providing power to the hypertube vehicle 110 in a hypertube system and of superconductor (HTS) electromagnets 310 disposed on the side of the hypertube vehicle 110 according to at least one embodiment of the present disclosure.

As illustrated in FIG. 3, the hypertube vehicle 110 uses a magnetic force between the superconductor electromagnets 310 installed in the vehicle 110 and the air-core linear synchronous motor 320 installed in the guideway 120 to obtain the driving force therefor. For example, the superconductor electromagnet 310 installed in the vehicle 110 may be a direct current (DC) electromagnet, which allows adjusting the phase of the current flowing through the ground-side three-phase air-core linear synchronous motor 320 for performing propulsion and control of the vehicle 110 with maximum efficiency.

Since the hypertube system according to the present embodiment controls the phase of the current flowing through the air-core linear synchronous motor 320 and thereby performs propulsion of the vehicle 110, it is significant to precisely grasp the position of the superconductor electromagnet 310 disposed on the side of the vehicle 110 or the position of the vehicle 110 in order to achieve maximum efficiency. By precisely determining the position of the vehicle 110, the phase of the current of the air-core linear synchronous motor 320 may be precisely controlled to increase the propulsion efficiency of the vehicle 110. At this time, it is preferable that no more than a few centimeters of error is generated in determining the position of the vehicle 110.

Figure 2:
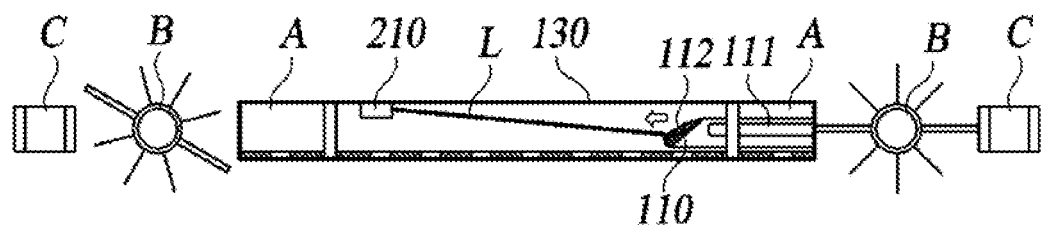
FIG. 2 is a diagram illustrating the principle of detecting the position of a hypertube vehicle by using a hypertube vehicle position detection system according to at least one embodiment of the present disclosure.

FIG. 2 is a diagram of a configuration of a hypertube vehicle position detection system according to at least one embodiment of the present disclosure, illustrating the principle of detecting the position of the hypertube vehicle 110 by using the hypertube position detection system.

As shown in FIG. 2, a hypertube vehicle position detection system according to some embodiments further includes at least one LiDAR sensor 210 in addition to the configuration shown in FIG. 1. In addition, the hypertube vehicle position detection system according to some embodiments includes a depressurizing chamber A, a departure and an arrival platform B, and a maintenance depot C among others.

The hypertube vehicle 110 may include a reflector 112. The reflector 112 may reflect a laser irradiated from the LiDAR sensor 210, and the laser reflected by the reflector 112 may be received by the LiDAR sensor 210 to detect the position of the hypertube vehicle 110. The reflector 112 may be formed to surround the front portion of the vehicle 110. On the other hand, the LiDAR sensor 210 as situated rearward of the vehicle 110 may irradiate a laser beam therefrom toward the vehicle 110, in which case the reflector 112 may be disposed on the rear portion of the vehicle 110 (shown in FIG. 9). The reflector 112 is preferably made of a material or an object having good reflectivity with respect to the laser.

The LiDAR sensor 210 detects the position of the hypertube vehicle 110 and the like. The LiDAR sensor 210 includes a laser transmitter (not shown) which irradiates a laser toward the hypertube vehicle 110. In addition, the LiDAR sensor 210 includes a laser receiver (not shown) for detecting a laser.

Meanwhile, the LiDAR sensor 210 may be mounted on the inner wall of the tube 130. To prevent the tube 130 from undergoing a 'Kantrowitz Limit' phenomena caused by choked flow or air resistance which limits the vehicle 110 from accelerating to the speed of 600 km/h or faster, a sufficient amount of empty space needs to be secured between the tube 130 and the vehicle 110 in addition to the moving path of the vehicle 110. The LiDAR sensor 210 may be disposed by utilizing such a clearance.

Although the LiDAR sensor 210 may be mounted on one location of the tube 130, multiples of the LiDAR sensor 210 may be disposed opposite each other about a central axis of the tube 130. This configuration will be described with reference to FIGS. 5A and 5B.

Figure 5A:
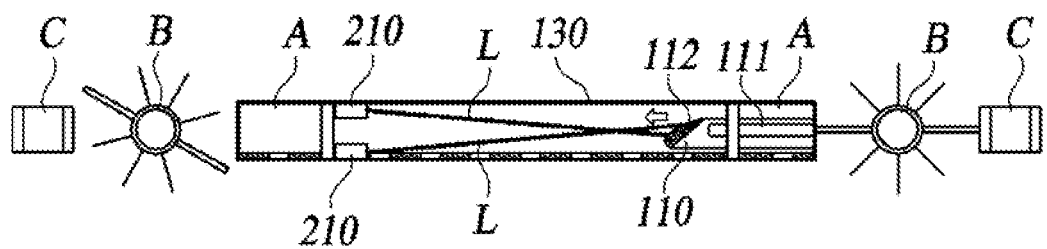
FIGS. 5A and 5B are diagrams each illustrating LiDAR sensor disposed opposite each other about a central axis of a tube, according to at least one embodiment of the present disclosure.
Figure 5B:
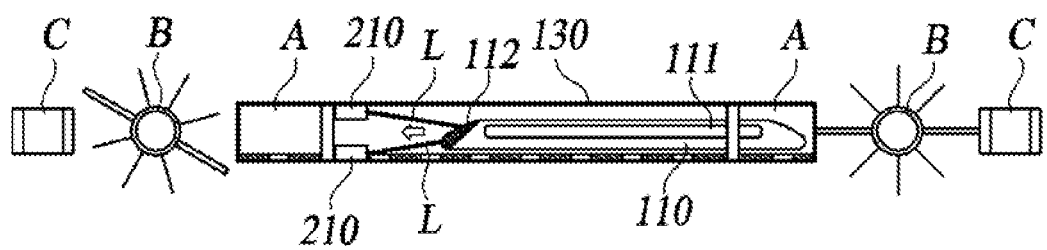

FIGS. 5A and 5B are diagrams of a hypertube vehicle position detection system according to at least one embodiment of the present disclosure, illustrating a configuration in which the LiDAR sensor 210 are disposed opposite each other about the central axis of the tube 130. Specifically, FIG. 5A illustrates the principle of detecting the position of the hypertube vehicle 110 when it is at a distance, and FIG. 5B as the hypertube vehicle 110 came closer.

With the LiDAR sensor 210 disposed in a single position on the tube 130, the laser irradiation and reflection angles are established almost horizontal on the ground plane when the LiDAR sensor 210 and the vehicle 110 are distanced from each other, having little chance of error occurring. However, when the vehicle 110 comes close to the LiDAR sensor 210, the laser irradiation and reflection angles are inclined with respect to the ground plane, thereby generating an error in the detected position of the vehicle 110.

In order to eliminate the position detection error generated for the above reasons, the additional LiDAR sensor 210 is provided. In particular, as illustrated, the multiple LiDAR sensors 210 arranged to face each other can reduce the chances of position detection error of the vehicle 110 even at the closer distance between the LiDAR sensor 210 and the vehicle 110 as in FIG. 5B. This is because the multiple LiDAR sensors 210 disposed at opposite positions are complementary to each other to perform the position detection function on the vehicle 110. On the other hand, multiple LiDAR sensors 210 may be disposed opposite each other about the center of the tube 130 and they may be disposed such that each distance from the vehicle 110 to each of the multiple LiDAR sensors 210 is different. It is understood that the multiple LiDAR sensors 210 may be arranged in a different form than that described above as long as they are configured to perform the complementary position detection.

The LiDAR sensor 210 has a laser transmitter and the laser receiver arranged adjacent to each other facing the same direction.

The laser transmitter transmits a laser for detecting the position of the vehicle 110. The laser irradiated from the laser transmitter is reflected from the reflector 112 of the vehicle 110.

The laser receiver receives the laser reflected from the reflector 112 of the vehicle 110. Specifically, the position of the vehicle 110 may be detected based on information on the laser being irradiated from the laser transmitter and reflected from the reflector 112 and received by the laser receiver. More specifically, the distance, direction, speed, etc. of the hyperloop vehicle 110 can be measured or calculated by measuring the time taken by the laser irradiated from the laser transmitter of the LiDAR sensor 210 until it reaches the laser receiver.

The guideway 120 provides propulsion to the hypertube vehicle 110 as described above. In addition, the guideway 120 keeps the hypertube vehicle 110 from deviating from its designated route.

The tube 130 is formed into a tunnel along the path of travel of the hypertube vehicle 110.

Meanwhile, a hypertube vehicle position detection system according to at least one embodiment of the present disclosure has the tube 130 provided internally with a laser absorber 131 for absorbing the laser reflected from the reflector 112.

Figure 4:
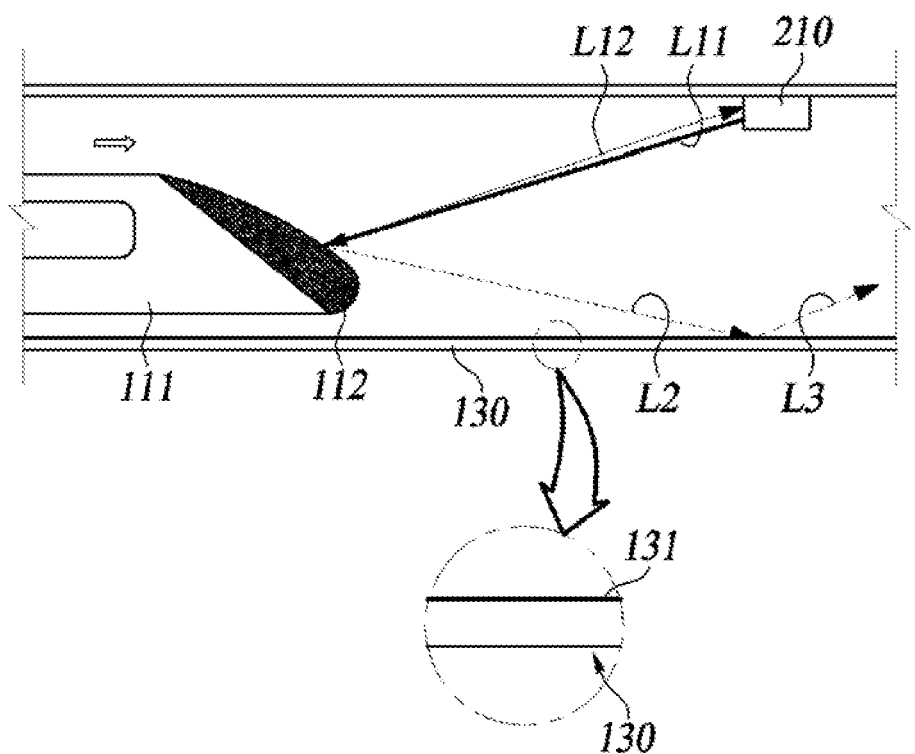
FIG. 4 is a diagram illustrating a principle of detecting the position of a vehicle by irradiating a laser from a LiDAR sensor according to at least one embodiment of the present disclosure.

Referring now to FIG. 4, a configuration in which the laser absorber 131 is disposed inside the tube 130 will be described. FIG. 4 is a diagram illustrating the principle of detecting the position of the vehicle 110 by irradiating a laser from the LiDAR sensor 210 in the hypertube vehicle position detection system according to at least one embodiment of the present disclosure.

A laser L11 irradiated from the laser transmitter of the LiDAR sensor 210 is reflected by the reflector 112 of the vehicle 110. In this case, the component of the laser reflected from the reflector 112, which is directly utilized for detecting the position of the vehicle 110 is a laser component L12 that is not refracted by any other reflecting element and reaches the laser receiver of the LiDAR sensor 210. At this time, laser components such as at L2, L3, etc. of FIG. 4, which are refracted after being incident on the wall surface of the tube 130, may also be received by the laser receiver of the LiDAR sensor 210 to generate noise. This may generate an error in the detected position of the vehicle 110.

In order to reduce the possibility of an error occurring due to the noise, the laser absorbing portion 131 may be disposed inside the tube 130. The laser absorbing portion 131 may be disposed to cover the entire inside of the tube 130. In addition, the laser absorber 131 may be made of a member having a plurality of crystallographic axes suitable for absorbing the laser or a member with polarizing properties. This will remove the noise generated by the diffused reflections of the laser, thereby reducing an error due to noise.

Meanwhile, a hypertube vehicle position detection system according to at least one embodiment of the present disclosure may include at least one angle adjuster 132 which functions to change the traveling path of the laser transmitted from the laser transmitter of the LiDAR sensor 210 and the traveling path of the laser reflected from the reflector 112. This configuration will be described with reference to FIG. 6.

Figure 6A:
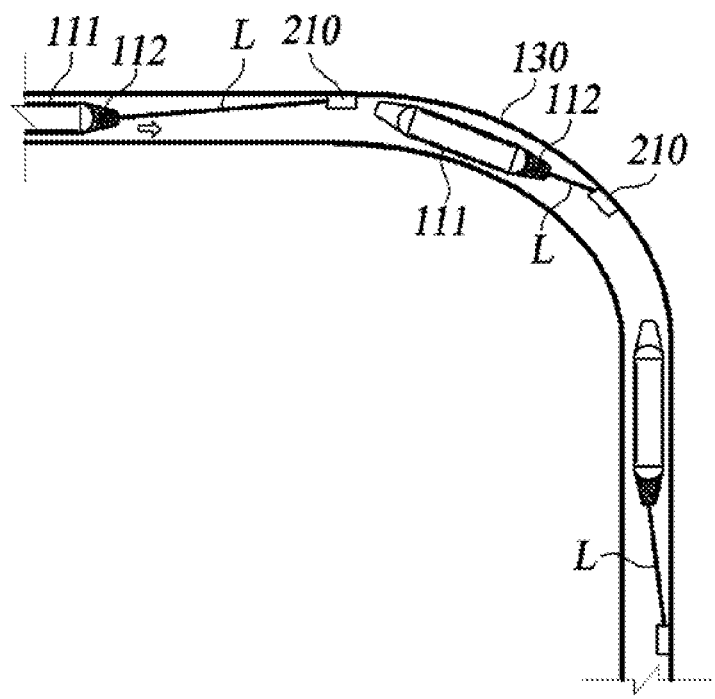
FIG. 6A is a diagram of a plurality of LiDAR sensor arranged in a curved tube, according to at least one embodiment of the present disclosure.

FIG. 6A is a diagram of a plurality of LiDAR sensor 210 arranged in a curved tube in a hypertube vehicle position detection system according to at least one embodiment of the present disclosure.

Where the LiDAR sensor 210 has secured a direct or straight view of the vehicle 110, a laser may be irradiated from the laser transmitter of the LiDAR sensor 210 to the reflector 112 of the vehicle 110 without an obstacle. In this case, the laser receiver can detect the position of the vehicle 110 by directly receiving the laser reflected from the reflector 112.

Whereas, the tube 130 may have a curve, which will interrupt the LiDAR sensor 210 disposed on the curved surface of the tube 130 from securing the linear path. Here, the tube 130 may be an obstacle to establishing a direct laser path linking the laser transmitter or the laser receiver to the reflector 112 of the vehicle 110. Accordingly, the plurality of LiDAR sensor 210 needs to be additionally disposed where to secure a view of the curved surface of the tube 130 or of the vehicle 110 located beyond the curved surface, which is cumbersome. This increases the number of required LiDAR sensor 210, resulting in increased efforts and costs related to the purchase, installation, and maintenance of the LiDAR sensor.

Figure 6B:
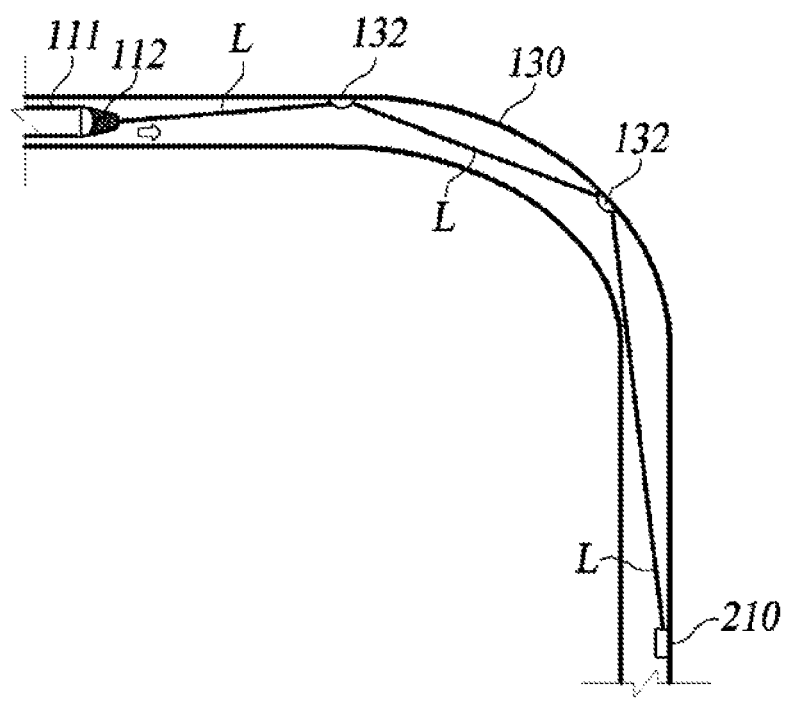
FIG. 6B is a diagram of an arrangement of angle adjusters according to at least one embodiment of the present disclosure.

In response, FIG. 6B illustrates an arrangement of the angle adjusters 132 in the hypertube vehicle position detection system according to at least one embodiment of the present disclosure.

In order to save the straight path of the laser from being hampered by the curvature of the tube 130, the angle adjusters 132 may be arranged as shown in FIG. 6B, thereby reducing the number of LiDAR sensor 210 required. In particular, the angle adjusters 132 are each disposed in the tube 130 to change the path of the laser beam emitted from the LiDAR sensor 210 or reflected from the reflector 112, thereby forming a laser path linking the vehicle 110 with the LiDAR sensor 210. At this time, the angle adjuster 132 may have a reflecting surface for reflecting the laser.

Figure 7:
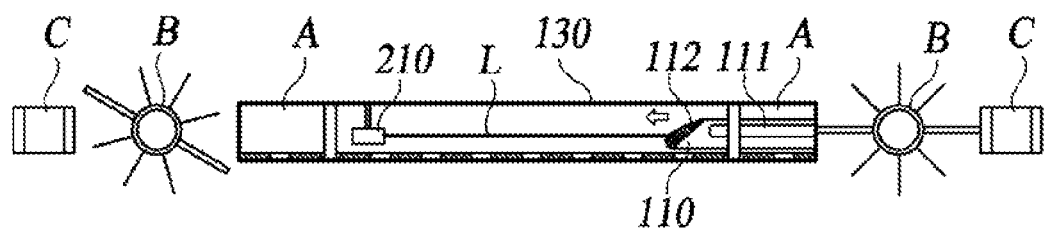
FIG. 7 is a diagram illustrating irradiation of a laser in a horizontal direction from a LiDAR sensor toward a hypertube vehicle, according to at least one embodiment of the present disclosure.

The following describes referring to FIG. 7, a configuration in which the travel path of the laser emitted from the LiDAR sensor 210 or reflected from the vehicle 110 is horizontally formed in the hypertube vehicle position detection system according to at least one embodiment of the present embodiment. FIG. 7 is a diagram illustrating irradiation of a laser in a horizontal direction from the LiDAR sensor 210 toward the hypertube vehicle 110 in the hypertube vehicle position detection system according to at least one embodiment.

In this embodiment, the LiDAR sensor 210 is disposed in parallel to the reflector 112 of the hypertube vehicle 110. At this time, the path of the laser transmitted from the laser transmitter of the LiDAR sensor 210 to the reflector 112 is formed parallel to the ground plane or the heading direction of the hypertube vehicle 110.

Figure 8:
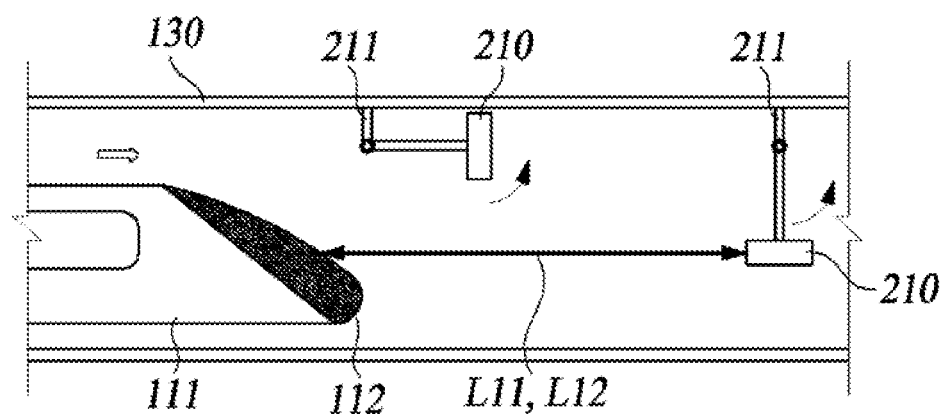
FIG. 8 is a diagram of LiDAR sensor configured to be repositioned to prevent collision between the LiDAR sensor and the vehicle, according to at least one embodiment of the present disclosure.

In this arrangement, only laser component L12, which is directly exchanged between the LiDAR sensor 210 and the reflector 112 of the vehicle 110 and is useful in the position detection of the vehicle 110, reaches the laser receiver with a relatively strong intensity (shown in FIG. 8). On the other hand, the reflection angles of other laser components acting as noise are relatively large to effectively scatter the laser components so that a reduced amount of noise components reaches the laser receiver. This can improve the accuracy of position detection.

It has been described with reference to FIG. 5 that LiDAR sensors 210 are disposed in order to prevent the detection of the vehicle 110 from becoming inaccurate when the vehicle 110 gets close to the LiDAR sensor 210. The inaccuracy of the position detection of the vehicle 110 depending on the distance between the vehicle 110 and the LiDAR sensor 210 is because the laser is irradiated with the laser path inclined against the vehicle 110. Formed parallel to the ground plane, the laser path can detect the position of the vehicle 110 more accurately regardless of the distance from the LiDAR sensor 210 to the vehicle 110.

However, when the LiDAR sensor 210 is disposed on the traveling path of the vehicle 110, there is a risk of an accident due to collision between the LiDAR sensor 210 and the vehicle 110, which can be resolved by an exemplary configuration described below with reference to FIG. 8. FIG. 8 is a diagram of the LiDAR sensor 210 having an illustrative movable structure for preventing a bump or collision between the LiDAR sensor 210 and the vehicle 110 in a hypertube vehicle position detection system according to at least one embodiment of the present disclosure.

The structure may be a sensor repositioning structure 211. The sensor repositioning structure 211 is coupled to the LiDAR sensor 210 and the tube 130 to fix the LiDAR sensor 210 and change the position of the LiDAR sensor 210.

Specifically, the sensor repositioning structure 211 is configured to change the position or shape of the LiDAR sensor 210 according to the movement of the hypertube vehicle 110 in order to prevent a bump or collision between the LiDAR sensor 210 and the vehicle 110. The sensor repositioning structure 211 may be constructed in a foldable configuration, as shown in FIG. 8, and alternatively but not exclusively, configured to adjust the length of a bar for varying the position of the LiDAR sensor 210. When constructed to adjust the length of a bar for varying the position of the LiDAR sensor 210, the sensor repositioning structure 211 may render the laser path to be inclined to the ground plane depending on the position of the LiDAR sensor 210 as shown in FIG. 2, and allow the laser path to be formed parallel to the ground plane as shown in FIG. 7.

Meanwhile, the system according to at least one embodiment includes a separate collision avoidance control device (not shown) that adjusts the mounting of the sensor repositioning structure 211. The collision avoidance control apparatus may vary the mounting of the sensor repositioning structure 211 according to the movement of the vehicle 110. For example, the vehicle 110 and the LiDAR sensor 210 are within a safe distance, the LiDAR sensor 210 may be made not to collide with the vehicle 110 through control such as folding the sensor repositioning structure 220211.

Figure 9:
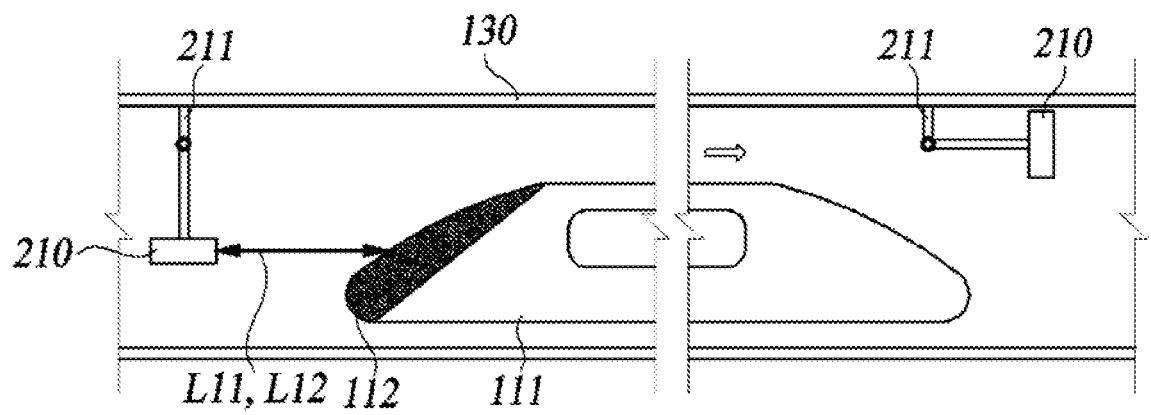
FIG. 9 is a diagram of a LiDAR sensor situated rearward of a hypertube vehicle, irradiating a laser toward the rear of the vehicle, according to at least one embodiment of the present disclosure.

Meanwhile, unlike FIG. 8, the vehicle 110 and the LiDAR sensor 210 may be prevented from colliding with each other by having the LiDAR sensor 210 situated rearward of the vehicle 110 on the traveling path thereof, which will be described with reference to FIG. 9. FIG. 9 is a diagram of the LiDAR sensor 210 situated rearward of the hypertube vehicle 110, irradiating a laser toward the rear of the vehicle 110 in the hypertube vehicle position detection system according to at least one embodiment of the present disclosure.

In the configuration shown in FIG. 9, the need to adjust the position of the LiDAR sensor 210 by using the sensor repositioning structure 211 is the same as described with respect to FIG. 8. However, different from FIG. 8, the configuration of FIG. 9 illustrates that the multiple LiDAR sensors 210 have one that is situated rearward of the hypertube vehicle 110 so that the rearward LiDAR sensor 210 is disposed parallel to the path of travel of the hypertube vehicle 110, while the multiple LiDAR sensors 210 have another one situated in front of the hypertube vehicle 110 so that the forward LiDAR sensor 210 may be repositioned to avoid collision with the hypertube vehicle 110.

At this time, when the sensor repositioning structure 211 is controlled by using the collision avoidance control device, the position of the LiDAR sensor 210 can be adjusted. In this case, the collision avoidance control device may reposition the forward LiDAR sensor 210 situated in front of the heading direction of the vehicle 10 out of the travel path of the vehicle 110 to prevent a collision between the vehicle 110 and the forward LiDAR sensor 210. In addition, the rearward LiDAR sensor 210 situated rearward of the heading direction of the vehicle 110 may be disposed at a position on a path through which the vehicle 110 has already passed so as to detect the position of the vehicle 110 and irradiate the laser toward the vehicle 110 in a horizontal direction.

At this time, the reflector 112 may be formed on the vehicle 110 at the rear surface thereof to reflect, from the rear of the vehicle 110, the laser irradiated toward the vehicle 110. On the other hand, the LiDAR sensor 210, which is situated in front of the traveling vehicle 110 away from the travel path of of the vehicle 110, may be relocated or repositioned upon receiving a signal from the collision avoidance control device after the vehicle 110 passes through the same LiDAR sensor 210 so that it gets back on the traveled path by the vehicle 110.

Figure 10:
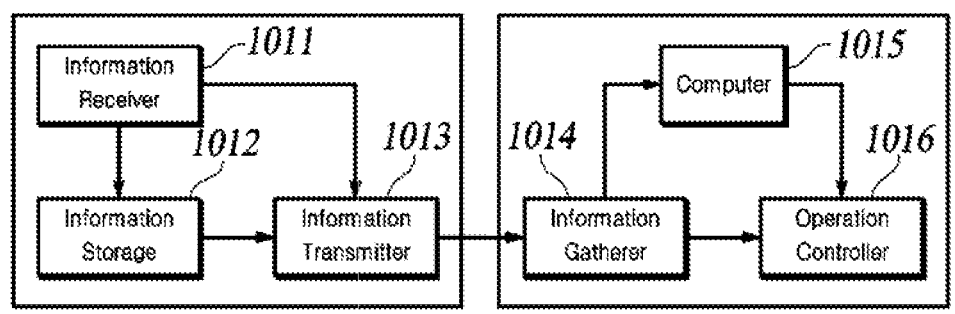
FIG. 10 is a diagram for illustrating a process of transmitting vehicle position detection information according to at least one embodiment of the present disclosure.

The following describes referring to FIG. 10, a configuration of the hypertube vehicle position detection system for detecting the position of the vehicle 110 and controlling the operation of the vehicle 110, according to at least one embodiment of the present disclosure. FIG. 10 is a diagram for illustrating a process of transmitting position detection information of the vehicle 110, in at least one embodiment.

As shown in FIG. 10, a hypertube system includes an information receiver 1011, an information storage 1012, an information transmitter 1013, an information-gatherer 1014, a computer 1015, an operation controller 1016, and the like.

The information receiver 1011 receives information contained in a receive laser which is received by the laser receiver of the LiDAR sensor 210. Here, the information contained in the receive laser includes a travel distance and a travel time of the receive laser.

The information storage 1012 receives the information in the receive laser from the information receiver 1011 and stores the same information.

The information transmitter 1013 receives and transmits the information in the receive laser to the information-gatherer 1014. Specifically, the information contained in the receive laser is transmitted from the information receiver 1011 to the information storage 1012, and then transferred from the information storage 1012 to the information transmitter 1013. Alternatively, the information in the receive laser may be transmitted directly from the information receiver 1011 to the information transmitter 1013 without passing through the information storage 1012.

The information-gatherer 1014 collects the information in the receive laser and processes the collected information into operational information of the vehicle 110. Here, the operational information of the vehicle 110 refers to information including data of the location of the vehicle 110 and the speed of the vehicle 110 and the like.

The computer 1015 calculates an electric current value corresponding to the direction and speed of the vehicle 110 based on the operational information received from the information-gatherer 1014 and transmits the calculated current value to the operation controller 1016.

The operation controller 1016 controls the operation of the hypertube vehicle 110. Specifically, the operation controller 1016 controls the direction and speed of the hypertube vehicle 110 based on the operational information of the hypertube vehicle 110 generated by the information-gatherer 1014. For example, the operation controller 1016 may control the operation of the hypertube vehicle 110 by controlling the three-phase current flowing in the air-core linear synchronous motor 320.

Figure 11:
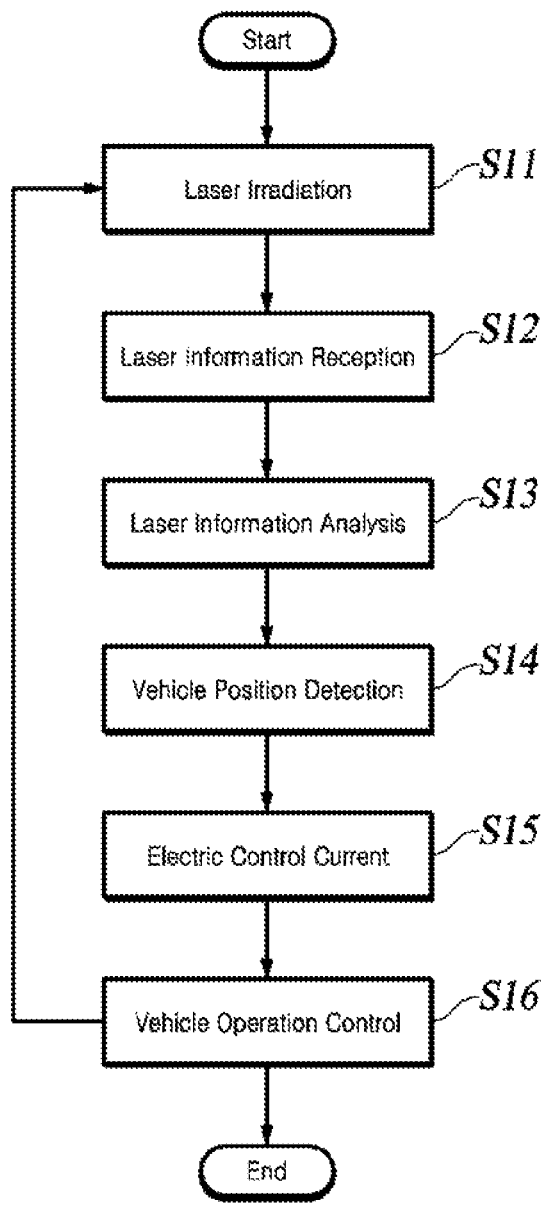
FIG. 11 is a flowchart of a process of detecting the position of a vehicle by receiving laser information and controlling the operation of the vehicle based on the detected vehicle position, according to at least one embodiment of the present disclosure.

The following describes, referring to FIG. 11, a process performed by the hypertube vehicle position detection system for detecting the position of the vehicle 110 and controlling the operation of the vehicle 110 according to at least one embodiment of the present disclosure.

FIG. 11 is a flowchart of a process of detecting the position of the vehicle 110 by receiving laser information and controlling the operation of the vehicle 110 based on the detected vehicle position, according to at least one embodiment of the present disclosure. However, in the present embodiment, the position detection or operation control process of the vehicle 110 is not necessarily performed in the order illustrated in FIG. 11, and the order is subject to change.

The vehicle position detection or operation control process according to the present embodiment includes steps of a laser irradiation (S11), a laser information reception (S12), a laser information analysis (S13), a vehicle position detection (S14), an electric current control (S15), and a vehicle operation control (S16).

In the laser irradiation step S11, the laser transmitter of the LiDAR sensor 210 irradiates a laser beam toward the reflector 112 of the vehicle 110.

In the laser information reception step S12, the laser reflected from the vehicle 110 is received after it had been irradiated by the laser transmitter 220 of the LiDAR sensor 210 in the laser irradiation step S11. In particular, the laser receiver of the LiDAR sensor 210 receives the reflected laser beam.

In the laser information analysis step S13, the information contained in the receive laser is received from the laser information reception step S12, and the received information is collected and analyzed. This process calculates information such as travel time, irradiation and reflection angles of the receive laser and the like.

In the vehicle position detection step S14, the position of the vehicle 110 is detected from the receive laser information calculated by the laser information analysis step S13. This session further provides information on the speed and direction of the vehicle 110 as well as the position of the vehicle 110.

In the electric current control step (S15), the current value to be applied to the air-core linear synchronous motors (LSMs) 320 is determined based on the information obtained by the vehicle position detection step (S14), and the air-core LSMs 320 are allowed to share the determined current value.

The vehicle operation control step S16 controls the speed, heading direction, etc. of the vehicle 110. The speed of the vehicle 110 is determined to correspond to the value of the current to flow in the air-core LSMs 320. Specifically, since the magnitude of the magnetic force acting between the superconductor electromagnets 310 installed in the vehicle 110 and the air-core LSMs 320 varies according to the value of the current flowing in the air-core LSMs 320, the speed and other aspects of the vehicle 110 are controlled by controlling the current value of the air-core LSMs 320.

Figure 12:
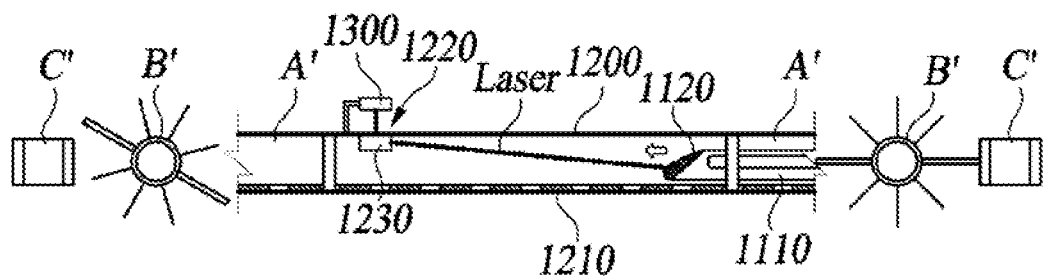
FIG. 12 is a diagram of a configuration of a hypertube system according to another embodiment of the present disclosure.

FIG. 12 is a diagram of a configuration of a hypertube system according to another embodiment of the present disclosure.

The hypertube system according to another embodiment of the present disclosure includes a hypertube vehicle 1100, a tube 1200, and a LiDAR sensor 1300 as described above.

In addition, the hypertube system according to another embodiment of the present disclosure may include a depressurizing chamber A', a departure and an arrival platform B' or a maintenance depot C' among others, although a detailed description thereof is omitted.

The hypertube vehicle or vehicle body 1100 may include a vehicle body 1110 and a reflector 1120.

As described above, the superconductor electromagnets 111 may be disposed under the vehicle body 1110 to propel the vehicle 1100 by electromagnetic interaction with the propulsion coil disposed on the guideway 1210.

The reflector 1120 may be disposed on the vehicle body 1110. For example, the reflector 1120 may be formed to surround the front portion of the vehicle 1100.

The LiDAR sensor 1300 may be adapted to operate when situated in front of the vehicle 1100 as will be described below with reference to FIG. 12. Alternatively, the LiDAR sensor 1300 may be configured to irradiate a laser beam from behind the vehicle 1100 toward the vehicle 1100, in which case the reflector 1120 may be disposed on the rear portion of the vehicle 1100. The reflector 1120 is preferably made of a material or an object having good reflectivity with respect to the laser.

The reflector 1120 may reflect the laser irradiated from the LiDAR sensor 1300 which may then receive the laser beam reflected by the reflector 1120 to detect the position of the hypertube vehicle 1100.

The LiDAR sensor 1300 detects the position of the hypertube vehicle 1100 and the like. The LiDAR sensor 1300 includes a laser transmitter (not shown) that irradiates a laser toward the hypertube vehicle 1100. In addition, the LiDAR sensor 1300 includes a laser receiver (not shown) for detecting a laser.

Meanwhile, the LiDAR sensor 1300 may be disposed outside the tube 1200 as shown in FIG. 12. This is to prevent the heat generation of the LiDAR sensor 1300 and the consequences caused by the heat.

Specifically, the LiDAR sensor 1300 detects the position of the vehicle 1100 by emitting a laser from the laser transmitter toward the vehicle 1100 and receiving the laser reflected from the vehicle 1100 by the laser receiver.

At this time, the position of the vehicle 1100 may be detected based on information on the laser received by the laser receiver after the laser irradiated from the laser transmitter is reflected from the vehicle 1100. For example, the position, speed, etc. of the hyperloop vehicle 1100 may be measured by measuring the time taken by the laser from its irradiation from the laser transmitter until it reaches the laser receiver.

At this time, the single LiDAR sensor 1300 detects the position of the vehicle 1100 separated by a few kilometers therefrom.

This causes the LiDAR sensor 1300 to use a high-output laser source so that the LiDAR sensor 1300 is likely to be heated by laser generation.

Due to its near-vacuum internal environment, the tube, when internally provided with a LiDAR sensor, suffers from a cooling deficiency through the heat transfer mechanism (conduction, convection, and radiation).

In such an environment, there may be difficulties associated with the operation of the LiDAR sensor, such as by continuously increasing the temperature of the LiDAR sensor, so that the LiDAR sensor fails. A possible solution is to construct an additional cooling system which, however, will increase the cost and complexity of the system.

An additional cooling system might generate a leakage at its heat transfer unit to jeopardize the near-vacuum state of the inside of the tube.

According to another embodiment of the present disclosure, a solution to the consequences caused by the temperature rise of the LiDAR sensor 1300 is to install the LiDAR sensor 1300 externally of the tube.

This also allows providing a configuration that the LiDAR sensor 1300 is cooled through a cooling apparatus, which is not shown so that the temperature rise can be prevented. At this time, the cooling apparatus may be water-cooled, air-cooled, and other possible types.

Meanwhile, the laser irradiated by the LiDAR sensor 1300 is irradiated toward the vehicle 1100 through a laser penetrator 1220 and a laser refractor 1230, which will be described below. As described above, the laser irradiated toward the vehicle 1100 may be reflected by the reflector 1120 of the vehicle 1100 and may be received by the laser receiver of the LiDAR sensor 1300 through the laser refractor 1230 and the laser penetrator 1220.

Figure 13:
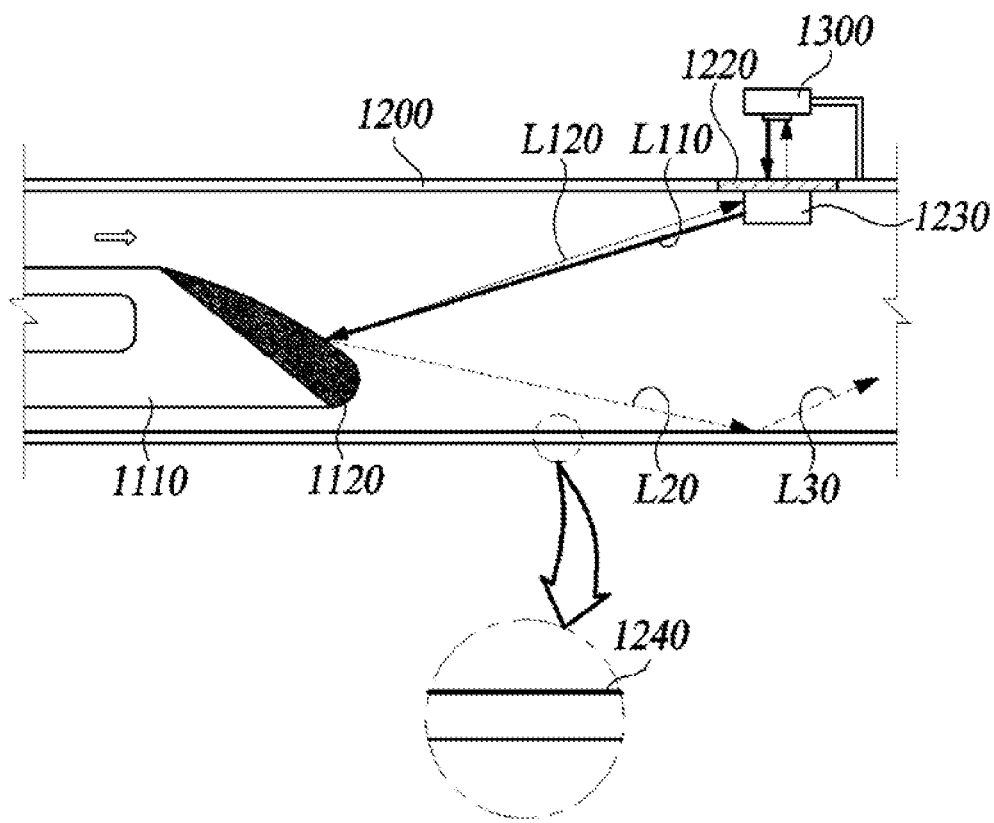
FIG. 13 is a diagram of a laser absorber formed on an inner wall of a tube in a hypertube system according to another embodiment of the present disclosure.

FIG. 13 is a diagram of a laser absorber 1240 formed on an inner wall of a tube 1200 in a hypertube system according to another embodiment of the present disclosure. The following describes, with reference to FIG. 13, the configuration of the laser absorber 1240 of the hypertube system according to another embodiment of the present disclosure and the laser irradiation process in the hypertube system according to another embodiment of the present disclosure.

In the hypertube system, a laser L110 irradiated from the laser transmitter of the LiDAR sensor 1300 is directed to pass through the laser penetrator 1220 and then refracted by the laser refractor 1230. Laser L110 refracted by the laser refractor 1230 is irradiated toward the vehicle 1100 and is reflected by the reflector 1120 formed on the vehicle body 1110.

Meanwhile, a laser L120 reflected by the reflector 1120 formed on the vehicle body 1110 is again refracted by the laser refractor 1230 and transmitted through the laser penetrator 1220 to the laser receiver of the LiDAR sensor 1300.

Within the laser reflected by the reflector 1120 are noise components L20 and L30 which interfere with the detection of the position of the vehicle 1100, in addition to the effective laser component L120 utilized directly for the position detection of the vehicle 1100. Laser components L20 and L30 are scattered to the wall surface of the tube 1200 as opposed to the components reflected by the reflector 1120 and then received by the laser receiver through the laser refractor 1230 and the laser penetrator 1220.

Such noise components L20 and L30 may generate an error with respect to the detected position of the vehicle 1100.

In order to reduce the possibility of error occurrence by noise components L20 and L30, the laser absorber 1240 may be disposed inside the tube 1200. The laser absorber 1240 may be disposed to cover some or all of the inside of the tube 1200 except for the laser penetrator 1220.

The laser absorber 1240 may also be made of a member having a plurality of crystallographic axes suitable for absorbing the laser or a member with polarizing properties. As described above, the laser absorber 1240 can absorb the laser components reflected by the reflector 1120, thereby removing noise otherwise received by the laser receiver of the LiDAR sensor 1300.

Figure 14:
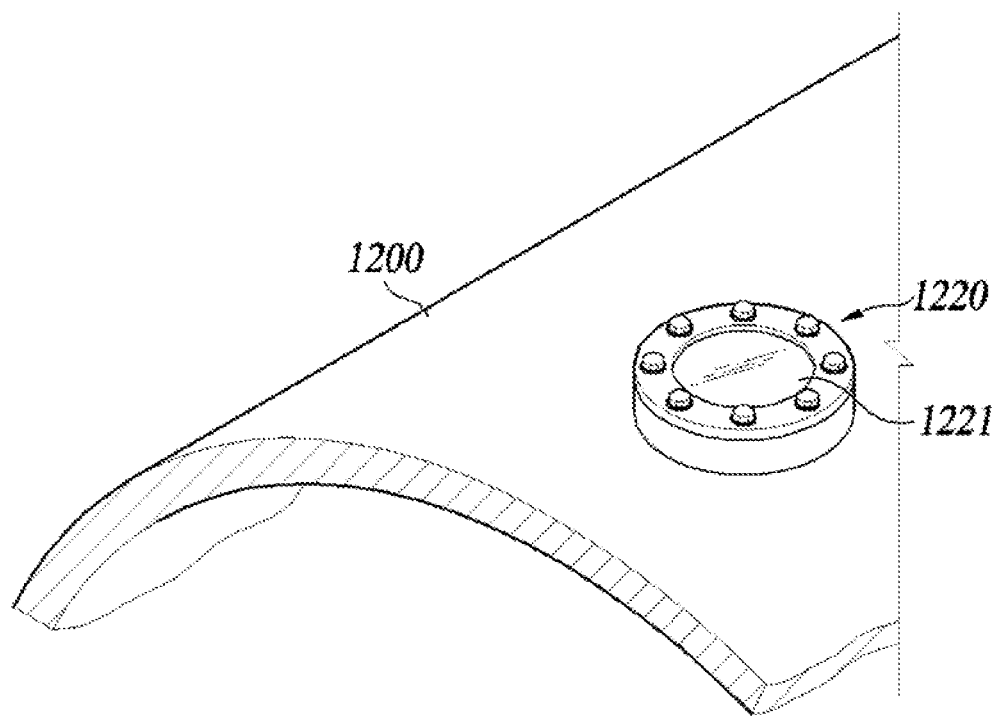
FIG. 14 is a diagram of a configuration of a laser penetrator of a hypertube system according to another embodiment of the present disclosure.
Figure 15:
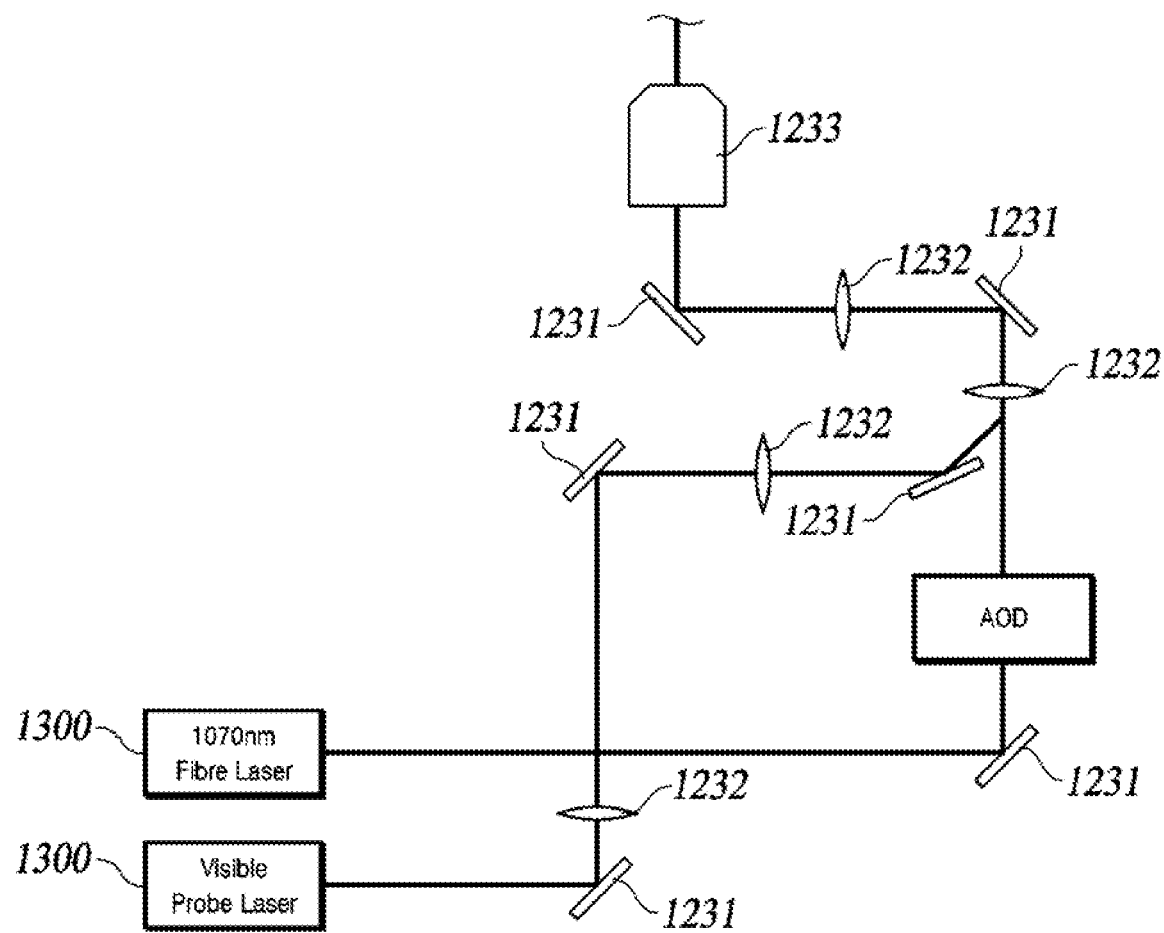
FIG. 15 is a diagram of a configuration of a laser refractor of a hypertube system according to another embodiment of the present disclosure.

FIG. 14 is a diagram of a configuration of the laser penetrator 1220 of a hypertube system according to another embodiment of the present disclosure. FIG. 15 is a diagram of a configuration of a laser refractor 1230 of the hypertube system according to another embodiment of the present disclosure.

The laser penetration 1220 may be formed at one location on the tube 1200. The laser penetration 1220 may include a transparent window 1221 which may be formed of, for example, a piece of transparent glass. The laser penetrator 1220 may allow the laser irradiated by the laser irradiation unit of the LiDAR sensor 1300 to pass into the tube 1200 and then irradiated toward the vehicle 1100.

In addition, the laser reflected by the vehicle 1100 may pass through the laser penetrator 1220 and then be received by the laser receiver of the LiDAR sensor 1300.

The laser refractor 1230 may be formed within the tube 1200. The laser refractor 1230 may include mirrors 1231, lenses 1232, and an emulsion oil unit 1233.

The laser of a 1070 nm fiber laser and a visible probe laser, irradiated by the laser irradiation portion of the LiDAR sensor 1300 may be refracted or reflected by one or more mirrors 1231 to be irradiated toward the vehicle 1100.

In addition, the laser refracted or reflected by each mirror 1231 passes through one or more lenses 1232 formed in its irradiation path in which the illustrative emulsion oil unit 1233 is disposed, thereby clearly grasping the position of the vehicle 1100. The above configuration may include an additional acousto-optic deflector (ADO) for controlling laser light.

In addition, the laser reflected by the reflector 1120 of the vehicle 1100 may also be refracted by the laser refractor 1230 and received by the laser receiver of the LiDAR sensor 1300.

Figure 16A:
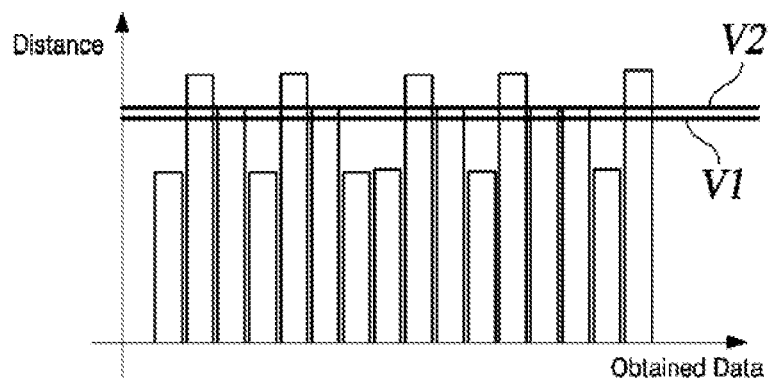
FIG. 16A is a graph of a data acquisition scheme in a comparative example for a laser received by a LiDAR sensor.
Figure 16B:
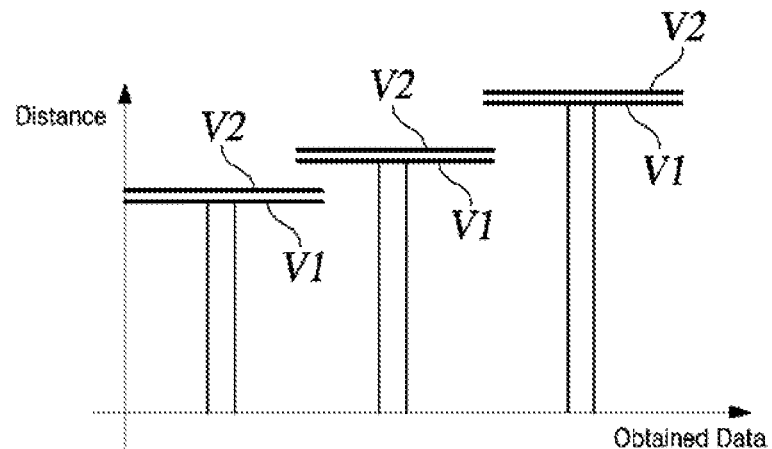
FIG. 16B is a graph of a data acquisition method for a laser received by a LiDAR sensor in a hypertube system according to another embodiment of the present disclosure.

FIG. 16A is a graph of a data acquisition scheme in a comparative example for a laser received by a LiDAR sensor, and FIG. 16B is a graph of a data acquisition method for a laser received by a LiDAR sensor 1300 in a hypertube system according to another embodiment of the present disclosure.

As shown in FIG. 16A, in the comparative example, a plurality of laser transmissions/receptions is performed through a LiDAR sensor to obtain a plurality of data items for the location or distance information of the vehicle. In addition, information V2 is calculated on the location or distance of the actual vehicle by using an average value V1 of the obtained data items.

However, this approach may have high reliability when the vehicle is at a stop or very low speed but is not suitable for detecting the position of such a high-speed vehicle as a hypertube vehicle reaching a maximum speed of 330 m/s.

For this reason, as shown in FIG. 16B, the hypertube system according to another embodiment of the present disclosure determines distances V2 of the actual vehicle 1100 by using a single laser transmission/reception data V1. This can tell the position or distance of the vehicle 1100 with high reliability even though the hypertube vehicle 1100 travels at super speed.

In this case, to increase reliability, multiple LiDAR sensors 1300 may be used to correct the obtained data. For example, the multiple LiDAR sensors 1300 may be disposed adjacent to each other to grasp the position or distance of the vehicle 1100.

At this time, in order for the information on the location or distance of the vehicle 1100 to have high reliability, the reflector 1120 of the vehicle 1100 preferably causes the minimum possible loss of the laser. In addition, it is preferable that the laser is scattered in the tube so that noise is minimized.

Further, it is significant to block the inflow of light which can act as a disturbance inside of the tube and on the irradiation path of the laser.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

CROSS-REFERENCE TO RELATED APPLICATION

This application claims priority from Korean Patent Application No. 10-2018-0054622 filed on May 14, 2018, the disclosure of which is incorporated by reference herein in its entirety.

The invention claimed is:

1. A hypertube system for detecting a position of a hypertube vehicle, comprising:
 a hypertube vehicle;
 a tube configured to surround a travel path of the hypertube vehicle;
 a LiDAR sensor mounted on an inner wall of the tube and including a laser transmitter configured to irradiate a laser beam toward the hypertube vehicle and a laser receiver configured to detect the laser beam;
 a reflector configured to reflect the laser beam irradiated from the LiDAR sensor; and
 a sensor repositioning structure coupled to the LiDAR sensor and the tube, and configured to prevent the LiDAR sensor from being broken away,
 wherein the laser beam reflected from the reflector reaches the laser receiver of the LiDAR sensor to be used in detecting the position of the hypertube vehicle, and
 wherein the sensor repositioning structure is configured to change a placement of the LiDAR sensor according to the hypertube vehicle progressing so as to prevent contact or collision between the LiDAR sensor and the hypertube vehicle.

2. The hypertube system of claim 1, wherein the reflector is disposed on the hypertube vehicle.

3. The hypertube system of claim 1, further comprising:
 a laser absorber disposed inside the tube to cover all or a portion of inner surfaces of the tube and configured to absorb the laser beam reflected from the reflector.

4. The hypertube system of claim 1, wherein the LiDAR sensor comprises multiple LiDAR sensors that are disposed on the inner wall of the tube, and wherein the multiple LiDAR sensors are disposed opposite to each other about a central axis of the tube.

5. The hypertube system of claim 1, further comprising:
 an angle adjuster configured to change a travel path of the laser beam transmitted from the laser transmitter and a travel path of the laser beam reflected from the reflector.

6. The hypertube system of claim 1, wherein the LiDAR sensor is arranged to face the reflector in a horizontal direction, and wherein a path of the laser beam transmitted from the laser transmitter to the reflector is approximately parallel to a ground plane or a heading direction of the hypertube vehicle.

7. The hypertube system of claim 6, wherein the LiDAR sensor comprises at least one rearward LiDAR sensor situated rearward of the heading direction of the hypertube vehicle where the at least one rearward LiDAR sensor is disposed to be approximately parallel to the ground plane or the heading direction of the hypertube vehicle, and at least one forward LiDAR sensor situated in front of the heading direction of the hypertube vehicle where the at least one forward LiDAR sensor is repositioned to get out of the travel path of the hypertube vehicle.

8. A hypertube control apparatus for controlling an operation of a hypertube vehicle by detecting a position of the hypertube vehicle, the hypertube control apparatus comprising:
- a superconductor electromagnet installed in the hypertube vehicle;
- an air-core linear synchronous motor configured to interact with the superconductor electromagnet to regulate a movement of the hypertube vehicle;
- a LiDAR sensor including a laser transmitter configured to irradiate a laser beam and a laser receiver configured to receive a reflected laser beam after reflection of the laser beam from a reflector on the hypertube vehicle;
- at least one processor configured to control a direction and a speed of the hypertube vehicle based on information contained in the reflected laser beam that is received by the laser receiver,
- wherein the LiDAR sensor is arranged to face the reflector in a horizontal direction, and wherein a path of the laser beam transmitted from the laser transmitter to the reflector is approximately parallel to a ground plane and a heading direction of the hypertube vehicle.

9. The hypertube control apparatus of claim 8, wherein the information contained in the reflected laser beam comprises a travel distance and a travel time of the reflected laser beam.

10. The hypertube control apparatus of claim 8, wherein the at least one processor is configured to control the direction and the speed of the hypertube vehicle by controlling a three-phase current flowing in the air-core linear synchronous motor.

11. A method of detecting a position of a hypertube vehicle, comprising:
- performing a laser irradiation by a LiDAR sensor for irradiating a laser beam to the hypertube vehicle;
- performing a laser reception by the LiDAR sensor for receiving the laser beam reflected from a reflector on the hypertube vehicle;
- performing a laser information analysis comprising collecting and interpreting information contained in the laser beam received by the performing of the laser reception; and
- performing a vehicle position detection comprising detecting an operational information about the hypertube vehicle from the performing of the laser information analysis,
- wherein the LiDAR sensor is arranged to face the reflector in a horizontal direction, and wherein a path of the laser beam transmitted from the LiDAR sensor to the reflector is approximately parallel to a ground plane and a heading direction of the hypertube vehicle.

12. The method of claim 11, further comprising:
performing an electric current control comprising:
- determining, based on information obtained by the performing of the vehicle position detection, a current value to be applied to an air-core linear synchronous motor providing power to the hypertube vehicle so as to control an operation of the hypertube vehicle; and
- applying the current value to the air-core linear synchronous motor.

13. The method of claim 11, further comprising:
performing a vehicle operation control comprising controlling a speed and the heading direction of the hypertube vehicle based on information obtained by the performing of the vehicle position detection.

14. A hypertube system for detecting a position of a hypertube vehicle, comprising:
- a hypertube vehicle;
- a tube configured to surround a travel path of the hypertube vehicle;
- a LiDAR sensor including a laser transmitter configured to irradiate a laser beam for detecting the position of the hypertube vehicle toward the hypertube vehicle and a laser receiver configured to detect the laser beam; and
- a sensor repositioning structure coupled to the LiDAR sensor and the tube, and configured to prevent the LiDAR sensor from being broken away,
- wherein the LiDAR sensor is disposed outside the tube.

15. The hypertube system of claim 14, wherein the tube comprises:
- a laser penetrator configured to pass the laser beam irradiated from the LiDAR sensor; and
- a laser refractor configured to change a travel path of the laser beam.

16. The hypertube system of claim 14, further comprising:
a cooler configured to cool the LiDAR sensor.

17. The hypertube system of claim 14, wherein the hypertube vehicle comprises a reflector configured to reflect the laser beam irradiated from the LiDAR sensor.

18. The hypertube system of claim 17, further comprising:
a laser absorber disposed inside the tube to cover inner surfaces of the tube and configured to absorb the laser beam reflected from the reflector.

19. The hypertube system of claim 14, wherein a position detection of the hypertube vehicle by the LiDAR sensor is obtained in a form of obtained data from a single measurement about the laser beam received by the laser receiver.

20. The hypertube system of claim 19, wherein multiple LiDAR sensors are disposed in adjacent regions, and wherein the obtained data is corrected by using each single measurement about a laser received by each of the multiple LiDAR sensors.

21. A system for detecting a position of a hypertube vehicle traveling within a tube, the system comprising:
- a LiDAR sensor including a laser transmitter configured to irradiate a laser beam for detecting the position of the hypertube vehicle toward the hypertube vehicle and a laser receiver configured to detect the laser beam; and
- a sensor repositioning structure coupled to the LiDAR sensor and the tube, and configured to prevent the LiDAR sensor from being broken away,
- wherein the LiDAR sensor is disposed outside the tube.

22. The system of claim 21, further comprising:
- a laser penetrator configured to pass the laser beam irradiated from the LiDAR sensor; and
- a laser refractor configured to change a travel path of the laser beam,
- wherein the laser penetrator and the laser refractor are disposed on the tube.

23. The system of claim 21, further comprising:
a cooler configured to cool the LiDAR sensor.

24. The system of claim 21, wherein further comprising:
a laser absorber disposed inside the tube to cover inner surfaces of the tube and configured to absorb the laser beam reflected from the hypertube vehicle.

25. The system of claim 21, wherein a position detection of the hypertube vehicle by the LiDAR sensor is obtained in a form of obtained data from a single measurement about the laser beam received by the laser receiver.

26. The system of claim 25, wherein multiple LiDAR sensors are disposed in adjacent regions, and wherein the obtained data is corrected by using each single measurement about a laser beam received by each of the multiple LiDAR sensors.

* * * * *